(12) United States Patent
Parkinson et al.

(10) Patent No.: US 6,300,979 B1
(45) Date of Patent: Oct. 9, 2001

(54) APPARATUS FOR MOUNTING A VIDEO CAMERA AND METHOD THEREOF

(75) Inventors: Joseph L. Parkinson, Boise, ID (US); Robert J. Crawford, Apple Valley, MN (US); Bryan R. Martin, Campbell, CA (US)

(73) Assignee: 8x8, Inc., Santa Clara, CA (US)

( * ) Notice: Subject to any disclaimer, the term of this patent is extended or adjusted under 35 U.S.C. 154(b) by 0 days.

(21) Appl. No.: 08/868,703

(22) Filed: Jun. 4, 1997

Related U.S. Application Data (63) Continuation-in-part of application No. 08/796,909, filed on Feb. 6, 1997, now Pat. No. 5,934,640.

(51) Int. Cl.⁷ .............................. H04N 5/225; H04N 7/14
(52) U.S. Cl. ................ 348/373; D16/203; D16/242; 248/187.1; 248/918; 348/14.05; 348/143; 348/211; 396/427; 396/428
(58) Field of Search .................... D16/242, 243; 248/187.1, 918; 361/681, 682; 396/419, 427, 428; 348/13, 14, 15, 143, 152–155, 158, 159, 169, 207, 211, 222, 231–233, 333, 334, 373, 375, 376, 552, 20; 358/906, 909.1

(56) References Cited

U.S. PATENT DOCUMENTS

| | | | |
|---|---|---|---|
| D. 276,612 | 12/1984 | McVicker et al. | D14/114 |
| D. 280,822 | 10/1985 | Judd et al. | D14/114 |
| D. 282,847 | 3/1986 | Hettinga | D14/114 |
| D. 305,330 | 1/1990 | Walters, II et al. | D14/114 |
| D. 316,709 | 5/1991 | Howard et al. | D14/114 |
| D. 363,471 * | 10/1995 | Shima | D14/106 |
| D. 373,580 * | 9/1996 | Nakada | D14/113 |
| 4,068,961 | 1/1978 | Ebner et al. | 403/55 |
| 4,500,060 | 2/1985 | Anderson et al. | 248/349 |
| 5,012,348 * | 4/1991 | Witzel | 348/373 |
| 5,322,255 * | 6/1994 | Garrett | 248/299.1 |
| 5,412,417 * | 5/1995 | Tozuka | 348/14 |
| 5,557,663 * | 9/1996 | Huang et al. | 348/14 |
| 5,708,853 * | 1/1998 | Sanemitsu | 348/376 |
| 5,734,414 * | 3/1998 | Nishimura et al. | 348/14 |
| 5,801,919 * | 9/1998 | Griencewic | 348/552 |
| 5,808,672 * | 9/1998 | Wakabayashi et al. | 348/552 |
| 5,815,197 * | 9/1998 | Kakii | 348/14.16 |
| 5,880,928 * | 3/1999 | Ma | 361/683 |
| 5,991,468 * | 11/1999 | Murakami | 382/313 |

OTHER PUBLICATIONS

Photocopy of a photo of Philips Phil–D000394A.
Photocopy of a photo of Connectix QuickCam.

* cited by examiner

*Primary Examiner*—Wendy R. Garber
*Assistant Examiner*—Ngoc-Yen Vu (57) ABSTRACT

A device for mounting a structure, such as a video camera, on a support includes a base and an arm projecting from the base. The video camera rests on one surface of the base and another surface rests on the support. The arm is adapted for insertion into a recessed cavity in the support, such as an antenna hole in a television set to provide a stable mounting device for the video camera. The angle of the video camera can be altered by pivoting the camera around the arm.

2 Claims, 8 Drawing Sheets

APPARATUS FOR MOUNTING A VIDEO CAMERA AND METHOD THEREOF

This application is a continuation-in-part of application Ser. No. 08/796,909, filed on Feb. 6, 1997, now U.S. Pat. No. 5,934,640, herein incorporated by reference.

FIELD OF THE INVENTION

The present invention relates generally to video camera mounting devices. More particularly, the present invention relates to devices for mounting and adjusting a video camera on a surface.

BACKGROUND OF THE INVENTION

In recent years, the technology for video-conferencing has advanced to a level where it has become practical for office and home use. The average consumer may now be able to have equipment, such as a video-phone, in the office and home which will permit the transmission of images to a person on the receiving end of a phone line. The video-phone includes a video camera pointed at the person engaging in the conferencing, with his image being transmitted to a display, such as a television or computer monitor, at the other person's location. It is desirable that the video camera be adjustable such that the person using the conferencing equipment may move around and then adjust the camera to focus on him.

Often the video camera is placed on top of or adjacent to the display device that shows the image of the other person on the phone line. Positioning the camera next to the display device allows the user to be facing the camera at the same time as he is watching the image of the other person. This positioning is desirable for both aesthetic and practical reasons. Thus, a variety of mounting devices have been developed for mounting a camera on a display device.

Among the types of mounting devices are those which have a rectangular-shaped base which sits on the top of the display. Several of these devices have adjustable height and swivel mechanisms. Other devices include a base with a cup-shaped platform for mounting on the display and a complementary ball-shaped attachment on the video camera to allow the camera to rest on the platform while still providing for adjustability. Each of these bases adds cost to the video camera system. Typically, the more elaborate the base, the higher the cost.

Furthermore, there is concern about the stability of mounting devices, especially on supports that are not entirely flat. Many mounting devices require a flat or nearly flat support surface and rely solely on frictional contact between the mounting device and the support surface to keep the video camera steady. However, inadvertent jarring of the camera may cause it to become unsteady and frictional forces between the mounting device and either the camera or support may not be sufficient to prevent the camera from falling.

Consequently, a need exists for a mounting device and a method which overcome the aforementioned shortcomings of the prior art.

SUMMARY OF THE INVENTION

One embodiment of the invention is a video camera support apparatus for mounting a video camera on a support. The apparatus includes a base and an arm projecting from the base. The arm is adapted for insertion into a recessed cavity in the support.

Another aspect of the invention is directed to a video camera mounted on the video camera support apparatus.

An additional embodiment of the invention is a method for mounting a video camera on a support. The method includes providing a video camera apparatus having a base and an arm projecting from the base. The arm is adapted for insertion into a recessed cavity of the support. The video camera is placed on the support and the arm is inserted in the recessed cavity.

The above summarizes various aspects of particular embodiments incorporating principles of the present invention. This summary discussion is not intended to summarize or describe every embodiment or every feature of the present invention.

BRIEF DESCRIPTION OF THE DRAWINGS

Other aspects and advantages of the present invention may become apparent upon reading the following detailed description and upon reference to the drawings in which.

While the invention is amenable to various modifications and alternate forms, specifics thereof have been shown by way of example in the drawings and will be described in detail. It should be understood, however, that the intention is not to limit the invention to the particular embodiments described. On the contrary, the intention is to cover all modifications, equivalents and alternatives falling within the spirit and scope of the invention as defined by the appended claims.

DETAILED DESCRIPTION OF THE PREFERRED EMBODIMENT

The present invention is believed to be useful in a variety of applications for mounting items, such as a video camera, on a support surface. The present invention has been found to be particularly useful for mounting a video camera on a display device and, in particular, for mounting a video camera on a television set in the antenna hole found on many television sets. It is in the context of this example that the various aspects of the invention are discussed.

Figure 1:
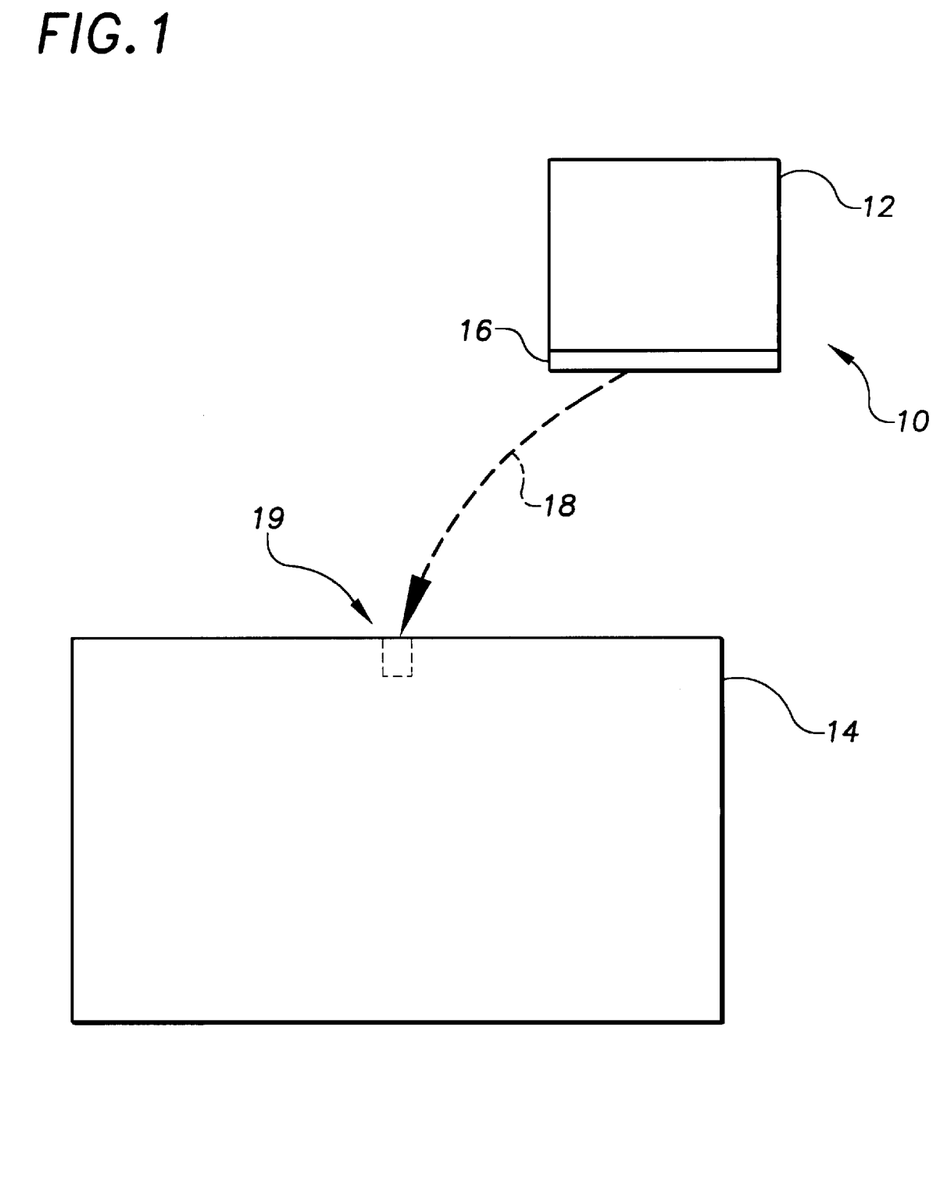
FIG. 1 is a schematic diagram of a video camera supporting apparatus, according to the invention, for mounting a video camera on a support.

One aspect of the present invention is schematically represented in FIG. 1. A video camera supporting apparatus 10 for mounting a video camera 12 on a surface of a support 14 includes a base 16 with a projecting member 18 (schematically represented as an arrow between base 16 and support 14) which is adapted for insertion into a recess 19 in support 14. When projecting member 18 is inserted into recess 19 and video camera 12 is mounted on base 14, the camera is held on the surface of the support by more than just frictional forces as projecting member 18 must be removed from recess 19 before camera 12 is moved.

Figure 2:
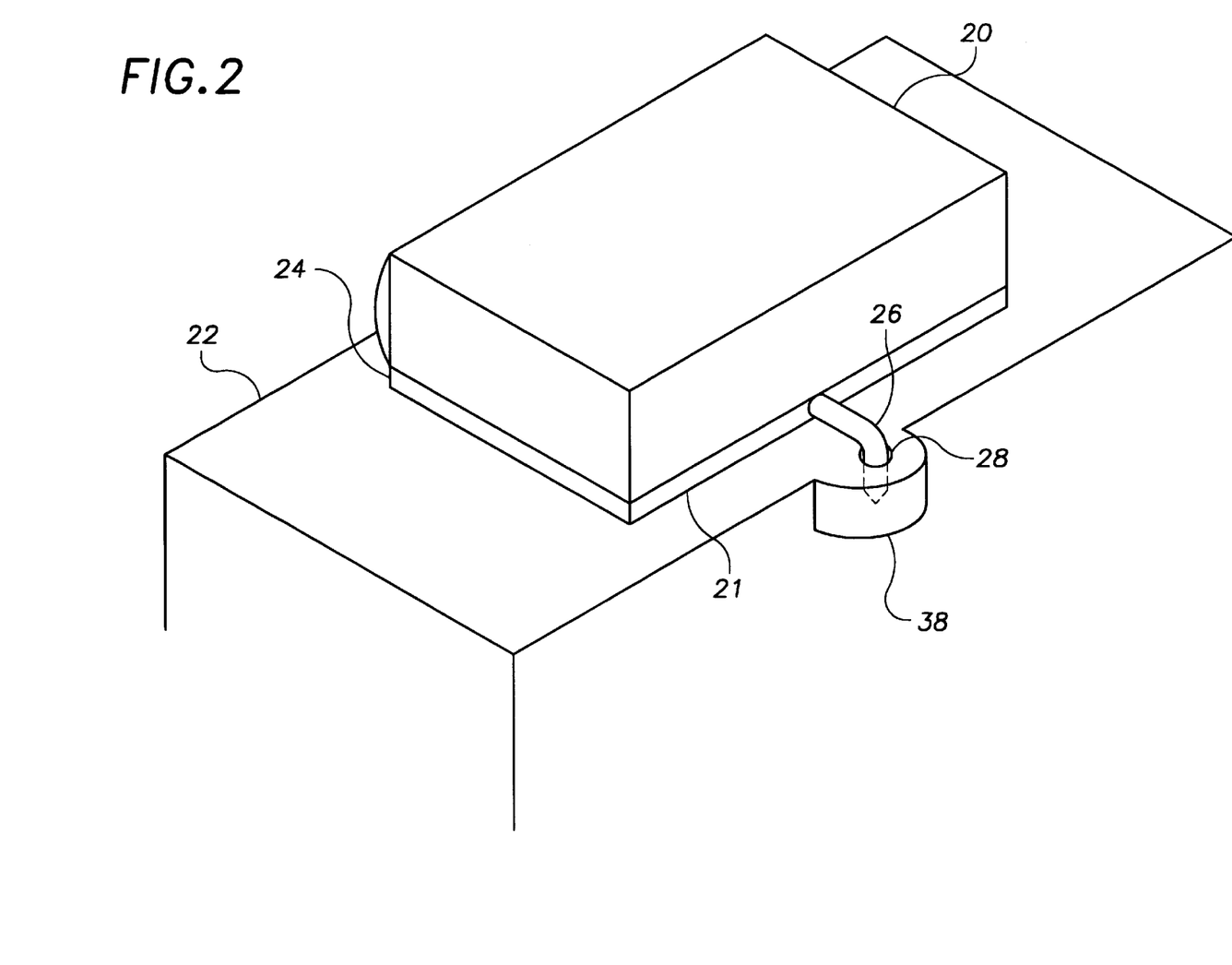
FIG. 2 is a perspective view an arrangement having a video camera mounted on a support using a video camera supporting apparatus, according to the invention.

FIG. 2 illustrates one embodiment of the present invention. A video camera 20 is mounted on a support 22, such as a shelf, cabinet, or display device. Suitable display devices include video, television, and computer monitors. Video camera 20 is positioned on a mounting device 21 which includes a base 24 with an attached arm 26. Arm 26 is adapted for insertion into a recessed cavity 28 in support 22.

Figure 3:
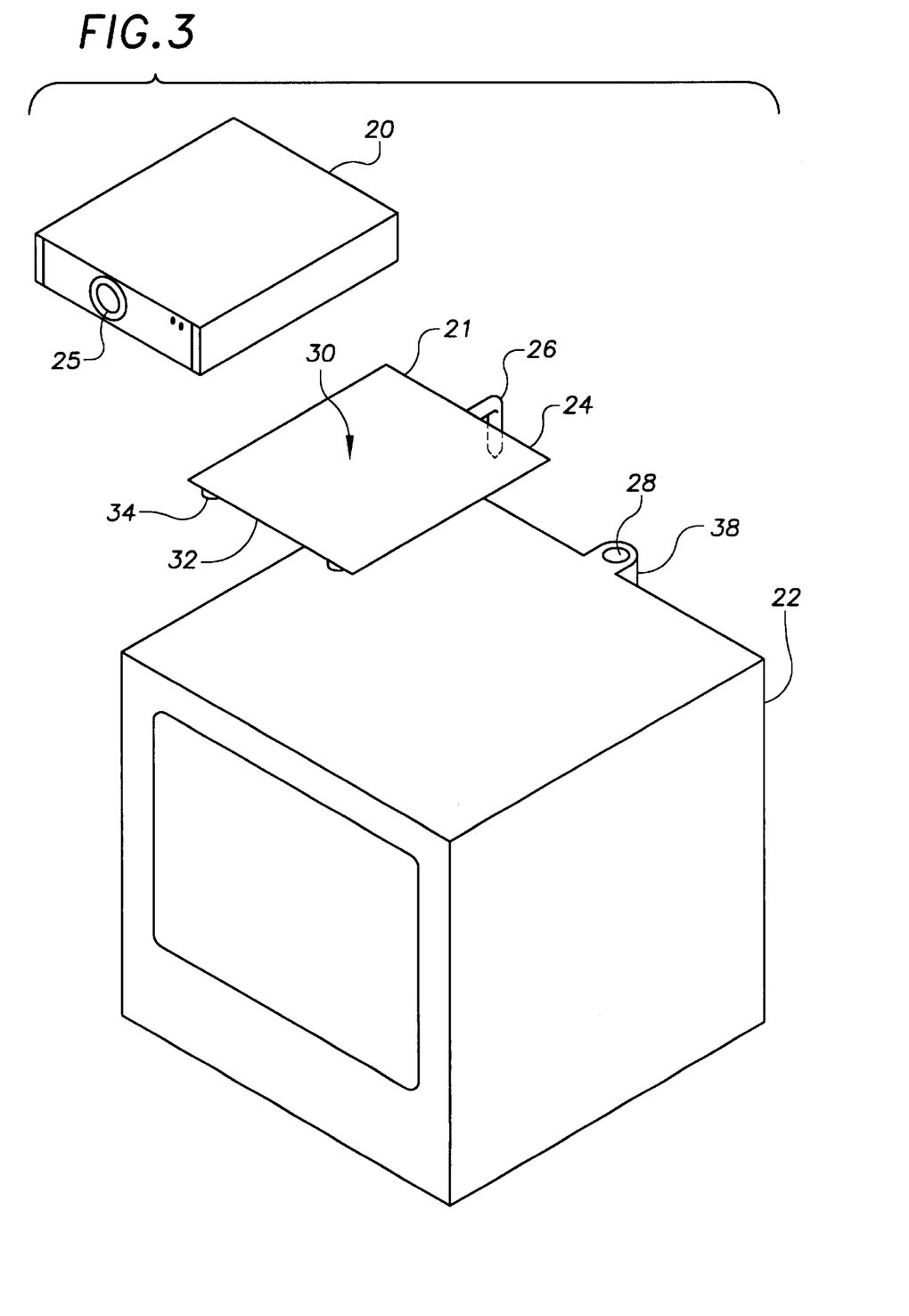
FIG. 3 is an expanded view of the arrangement of FIG. 2.

FIG. 3 is an exploded view of the arrangement of FIG. 2. Base 24 has a camera-holding surface 30 upon which the video camera sits and a resting surface 32 which rests upon support 22. Resting surface 32 may optionally include one or more legs 34 to hold base 24 off support 22 to prevent scratching or damage of the surface of support 22.

Base 24 may be an integral part of video camera 20. For example, base 24 may function as a part of the camera housing. Alternatively, base 24 is detachably or permanently mounted on video camera 20 by attachment members such as adhesives, screws, bolts, pins, rivets, or interlocking connectors or by attachment methods such as welding or soldering. In one embodiment, base 24 is mounted on camera 20 using attachment members, for example, interlocking connectors, which allow for quick and easy demounting of base 24 without the need for additional tools.

Figure 4:
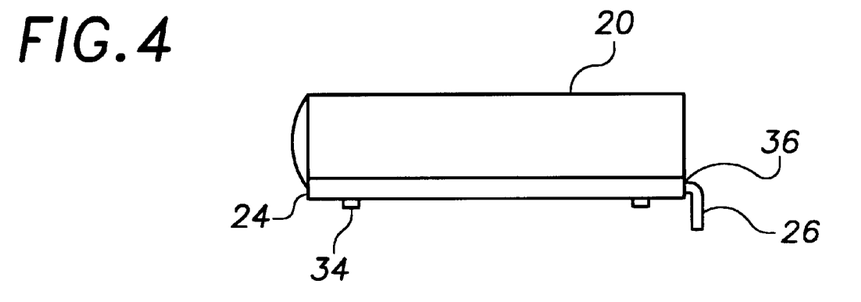
FIGS. 4–6 are side views of various embodiments of the video camera supporting apparatus, according to the invention.
Figure 5:
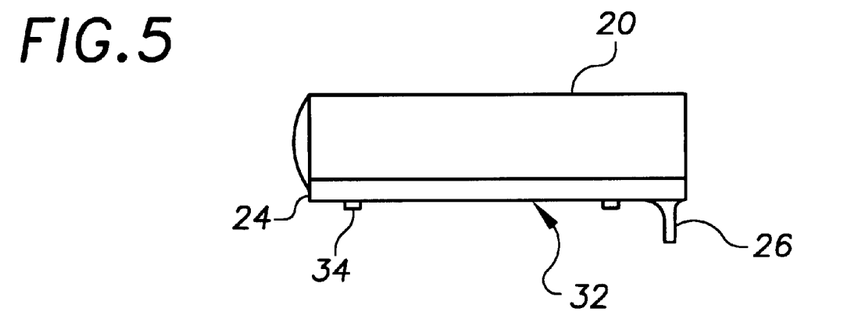
Figure 6:
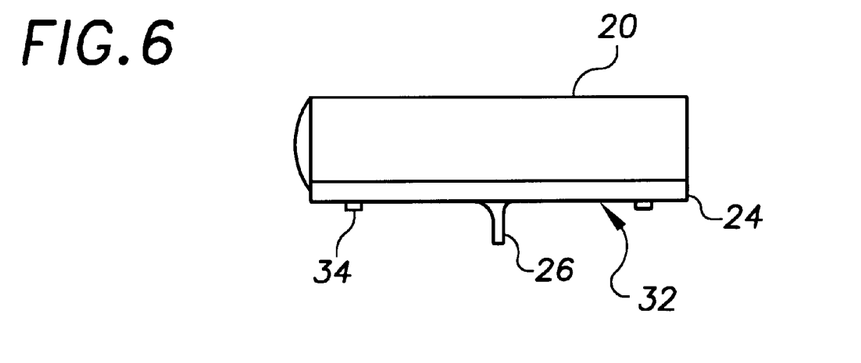

Arm 26 is attached to base 24. FIGS. 4–6 show various embodiments and attachment positions of arm 26. A portion of arm 26 may extend substantially perpendicularly with respect to resting surface 32 of base 24 for insertion of arm 26 into cavity 28. In the embodiments shown in FIGS. 5–6, substantially all of arm 26 extends substantially perpendicularly from base 24. Alternatively, arm 26 may have an inverted L-shape, as shown in FIG. 4, so that a portion of arm 26 projects out from base 24 and is connected to another portion that extends substantially perpendicularly to base 24. Other configurations of arm 26 may also be used, including arm segments disposed at angles other than perpendicular. Such configurations may be useful for cavities angled non-perpendicularly with respect to the surface of the support.

Arm 26 can be attached to an edge 36 of base 24, as shown in FIG. 4, or to resting surface 32 of base 24, as shown it FIGS. 5–6. One particularly useful position for attachment of arm 26, shown in FIG. 5, is at the center of the back edge of base 24 (the back of base 24 being defined as the side opposite the lens 25 of camera 20). Another useful position for attachment of arm 26, shown in FIG. 6, is the center of resting surface 32. Proper positioning of arm 26 will depend upon considerations such as the position of cavities in contemplated supports, the weight distribution of components in the video camera, and the ease of insertion. Thus, other attachment positions may also be used.

Figure 7:
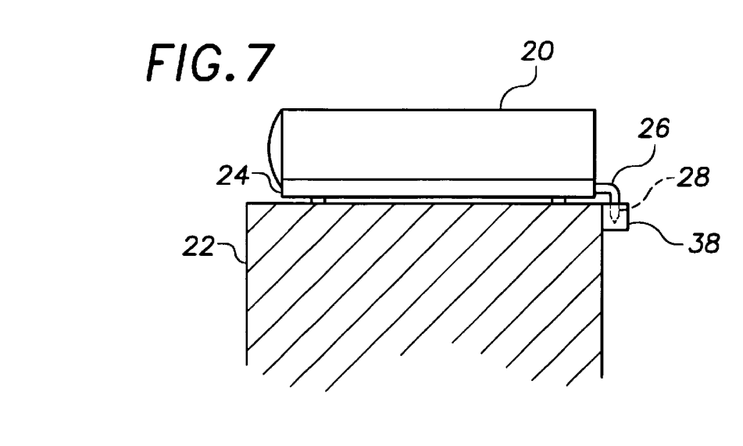
FIGS. 7–10 are side views illustrating several methods of positioning the apparatuses of FIGS. 4–6 on various types of supports.
Figure 8:
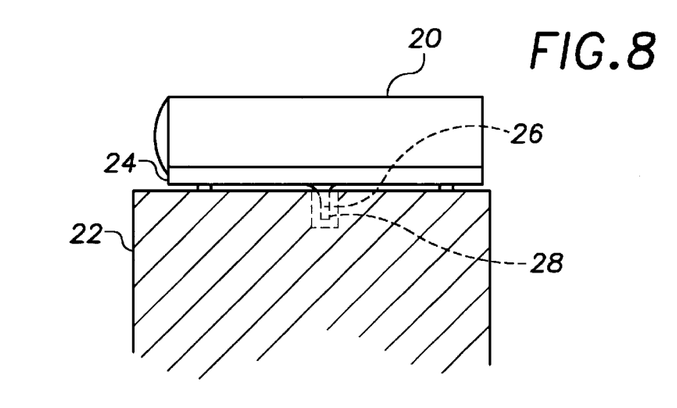
Figure 9:
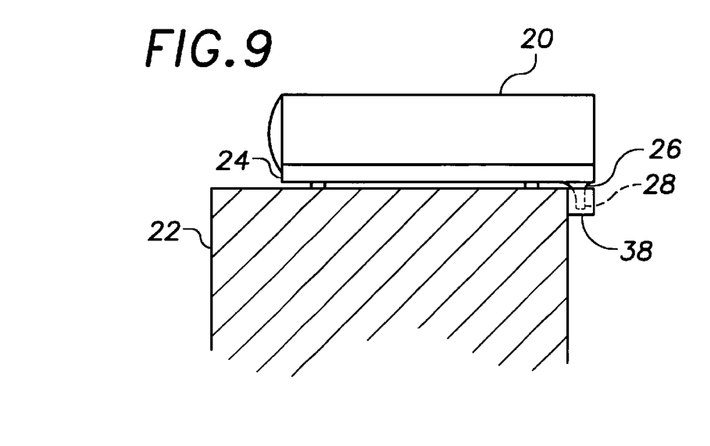
Figure 10:
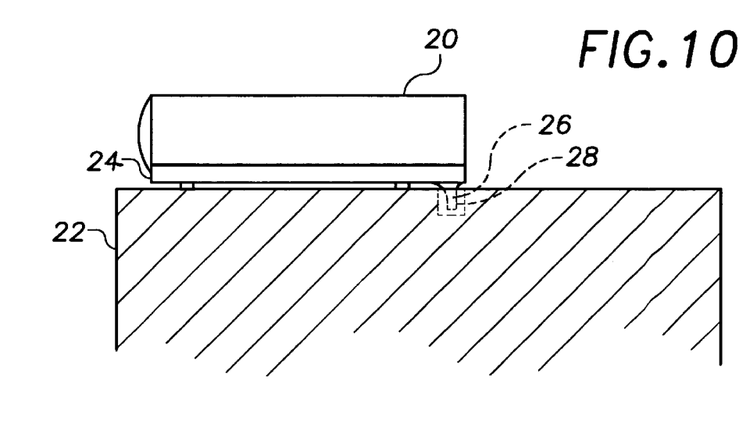

FIGS. 7–10 show various ways of positioning the video camera apparatuses of FIGS. 4–6 on a support. In FIGS. 7 and 9, cavity 28 is located in an extension 38 (see FIG. 2) of support 22. One common example of such a cavity is an antenna hole in a television set. Alternatively, cavity 28 may be found directly within support 22, as shown in FIGS. 8 and 10. In any case, arm 26 is positioned on base 24 so that, upon insertion of arm 26 in cavity 28, camera 20 will be stably positioned on support 22.

Figure 12A:
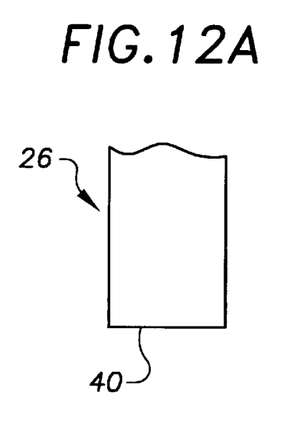
FIGS. 12A–C are side views of various embodiments of a tip of an arm of the apparatus of FIG. 2.
Figure 12B:
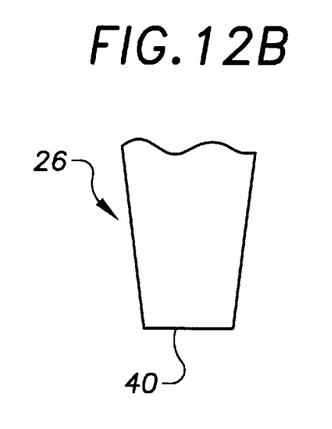
Figure 12C:
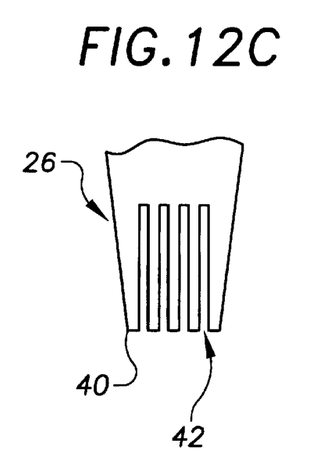

FIGS. 12A–C show various embodiments of a tip 40 of arm 26 for insertion into cavity 28. Often tip 40 has the general shape of cavity 28, however, other shapes may be used, for example, a star-shaped tip for insertion into a larger cylindrical cavity. Many cavities are cylindrically-shaped and so tip 40 will also often have a cylindrical shape, as shown in FIG. 12A. Although generally cylindrical, tip 40 may have tapered walls, as depicted in FIG. 12B, to allow for easier insertion into cavity 28. Tapered tips may also allow for adaptation of arm 26 into cylindrical cavities having different diameters.

In another embodiment, illustrated in FIG. 12C, tip 40 is hollow with a cylindrically-tapered form and one or more slits 42 in the material of tip 40. Slits 42 permit tip 40 to be pushed into a space having a diameter smaller than the initial diameter of tip 40. When tip 40 is inserted into cavity 28, slits 42 are crimped together (i.e., the space between the slits is decreased) to conform tip 40 to cavity 28. This configuration provides increased frictional contact between arm 26 and cavity 28, thereby making arm 26 less likely to be accidentally removed from cavity 28.

Arm 26 may be integrally formed on base 24. Alternatively, arm 26 may be detachably or permanently mounted on base 24 using attachment members such as adhesives, screws, bolts, rivets, pins, or interlocking connectors on both base 24 and arm 26. In one embodiment, arm 26 is mounted on base 24 using attachment members that allow for quick and easy detachment of arm 26 without the need for additional tools. Often it is desirable that either base 24 or arm 26 be detachable so that camera 20 can be placed on a support that does not have a cavity and/or that camera 20 and/or base 24 can be used if arm 26 is broken or lost. In another embodiment, base 24 is configured with multiple sites at different positions on the base for attachment of arm 26 so that the same base and arm can be used to create, for example, either of the configurations of FIGS. 5 and 6, by detaching arm 26 and reattaching it at the desired position on base 24. This embodiment allows for easy adaptation of the video camera supporting apparatus to a wide variety of supports and cavity positions.

Figure 11:
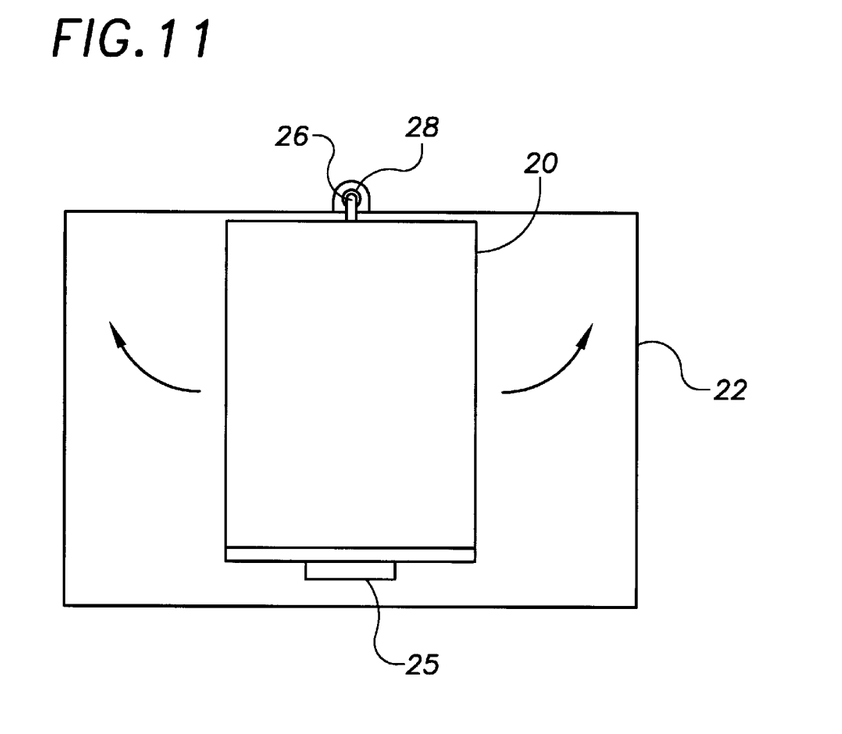
FIG. 11 is a top view of the arrangement in FIG. 2, depicting the pivoting of a video camera about an arm of a supporting apparatus.

Camera 20 can also be pivoted about arm 26, as shown in FIG. 11. When arm 26 is in cavity 28, camera 20 can be swiveled about arm 26 without removing the arm from the cavity. This allows for the adjustment of camera 20 so that the lens 25 of camera 20 can be pointed in a desired direction.

Figure 13:
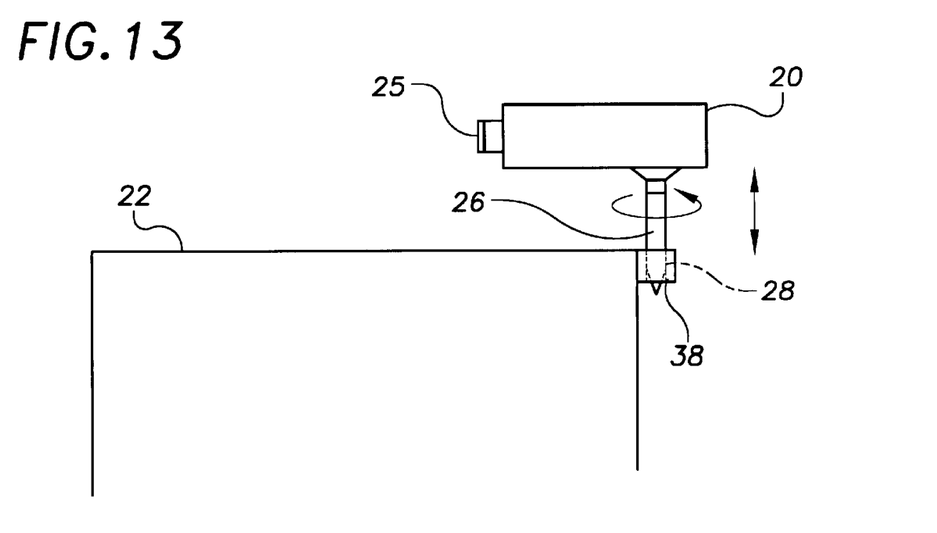
FIG. 13 is a side view of an alternative embodiment of a video camera support apparatus, according to the invention.

An alternative embodiment of the video camera support apparatus is illustrated in FIG. 13. In this embodiment, arm 26 is the only portion of the apparatus which is in contact with support 22. In this embodiment, arm 26, when inserted in cavity 28, extends vertically to base 24 which is a platform upon which camera 20 sits. In this configuration, the camera may be adjustably mounted on base 24 so that the camera can be rotated both horizontally and vertically, as shown in FIG. 13. This allows the camera to be pointed in a desired direction by an operator.

Arm 26 is typically short so that camera 20 is near the surface of support 22. This positioning of the camera is particularly useful when camera 20 is part of a video-phone system and sits on a support 22 which is a display device for showing the image of the other person on the phone line. A user can then view the image on the display device and still appear as if he or she is looking at the camera, thus facilitating "face-to-face" video-conferencing.

Figure 14:
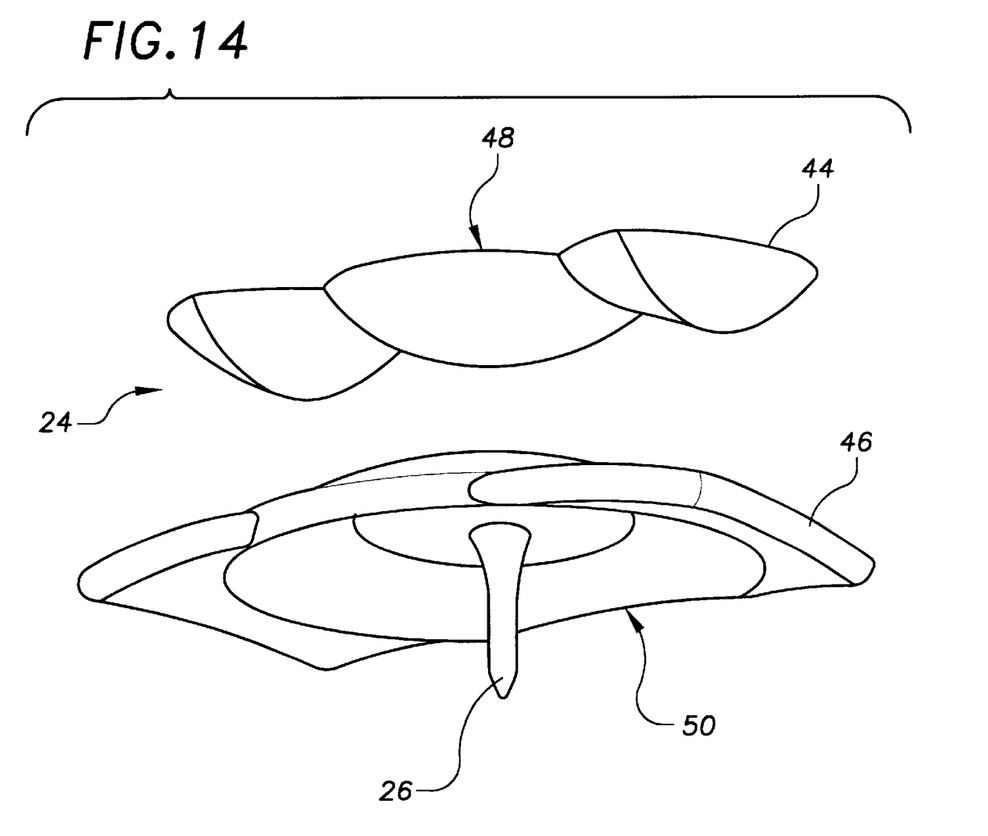
FIG. 14 is an exploded bottom perspective view of one embodiment of a mounting device, according to the principles of the invention.
Figure 15:
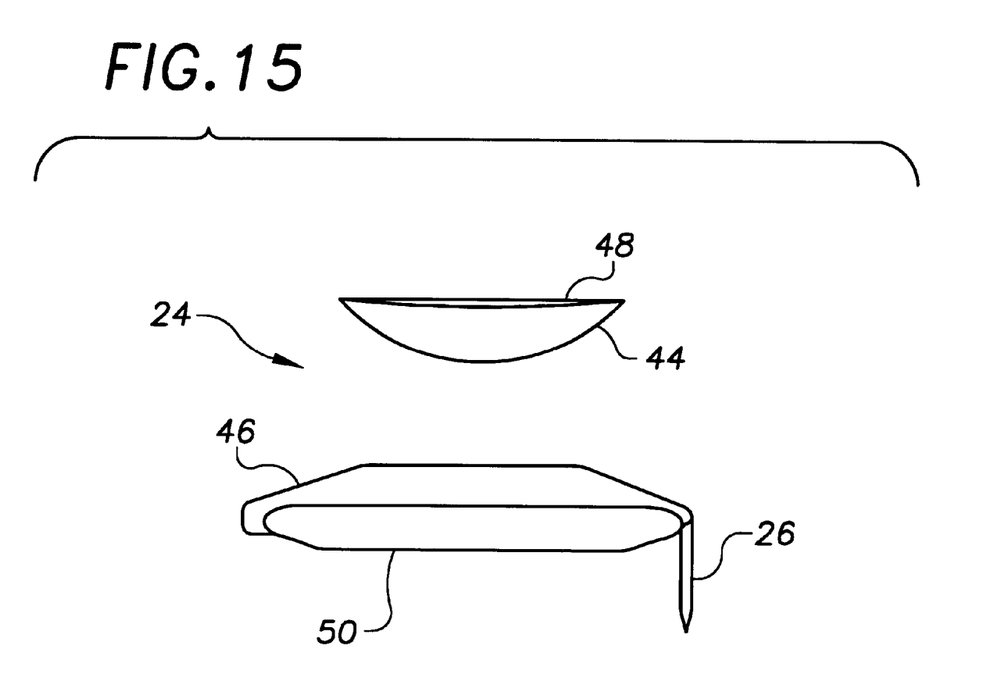
FIG. 15 is an exploded side elevational view of another embodiment of a mounting device, according to the principles of the invention.

Another type of mounting device is illustrated in FIGS. 14–15. This type of device includes a base 24 having a camera attachment portion 44 and a platform 46 which typically have complementary shapes. A variety of these devices can be made. One such device is described in U.S. Pat. No. 5,934,640 herein incorporated by reference, and illustrated in FIGS. 14–15. Parts of both the camera attachment portion 44 and the platform 46 of this particular device are rounded so that, when engaged, attachment portion 44 and platform 46 can swivel and rotate with respect to each other. A video camera provided on a camera resting surface 48 of attachment portion 44 can then be oriented in a desired direction.

Platform 46 has a surface 50 upon which is designed to rest on support 22. Attached to the platform 46 is an arm 26, described above, which is adapted for insertion into a cavity of the support. Arm 26 is typically attached to surface 50. Arm 26 may be provided at the center of resting surface 50, as shown in FIG. 14, or near an edge of the resting surface 50, as shown in FIG. 15. Other arrangements of arm 26 with respect to resting surface 50 and/or platform portion 46 may be advantageous depending on factors such as weight distribution, the arrangement of cavities in contemplated supports, and ease of insertion.

The described use and arrangement of an arm with a base having two or more portions can be applied to a wide variety of bases including, for example, a base with ball and cup sections.

The video camera supporting devices of the present invention are particularly useful for positioning a video camera on a display device, such as a television or computer monitor. In particular, televisions often have an antenna hole in which arm 26 can be inserted. Other supports, such as computer monitors or shelves, may have cavities that are, for example, specifically provided for placement of a video camera device. Alternatively, some supports may be retrofitted to include such cavities by either attachment of an extension to the device (similar to that shown in FIG. 2) or by making a suitable cavity, for example, by drilling a hole in a shelf.

One important use of mounted video cameras 20 is for video-phone. A display device, possibly support 22, is connected to the video camera and acts as the display for the video-phone. The video camera is typically connected to the display device via cables between audio and video ports on the camera and the display device. Some television sets, particularly older models, do not have separate video and audio inputs. In these cases, an adapter can be used to combine the video and audio output from the camera into a single input line which is connected to the antenna or cable input connector on the television set. Computers may have cards with appropriate circuitry to receive, interpret, and/or display the signals from the camera.

The video camera may also include compression circuitry which will compress the video and audio signals for more efficient transmission. The signals being uncompressed upon reception at the display device. Alternatively, the signals may be used in the compressed form if the display device is adapted for such reception.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A video camera support apparatus for mounting a video camera in a recessed cavity of a television having a display screen, the apparatus comprising:

a base adapted to secure the video camera and position the video camera above the display screen; and an arm projecting from the base, the arm adapted for insertion into the recessed cavity in the television, the recessed cavity configured and arranged for holding an antenna.

2. A method for mounting a video camera in a recessed cavity of a television having a display screen, the recessed cavity configured and arranged for holding an antenna, the method comprising the steps of:

providing a video camera apparatus having a base and an arm projecting from said base, the arm adapted for insertion into the recessed cavity; and inserting the arm into the recessed cavity and positioning the video camera above the display screen.

* * * * *